(No Model.)

S. P. SAYRE.
ROTARY HARROW.

No. 325,865. Patented Sept. 8, 1885.

Witnesses.
A. Ruppert,
E. A. Ellsworth.

Inventor:
Sylvester P. Sayre
Per
Thomas P. Simpson
Attorney

UNITED STATES PATENT OFFICE.

SYLVESTER P. SAYRE, OF NEW MARTINSVILLE, ASSIGNOR OF ONE-HALF TO CHARLES W. BARRACK, OF WETZEL COUNTY, WEST VIRGINIA.

ROTARY HARROW.

SPECIFICATION forming part of Letters Patent No. 325,865, dated September 8, 1885.

Application filed October 3, 1884. (No model.)

*To all whom it may concern:*

Be it known that I, SYLVESTER P. SAYRE, of New Martinsville, in the county of Wetzel and State of West Virginia, have invented an Improved Rotary Harrow, of which the following is a specification.

The special object of the invention is to make certain improvements in rotary harrows, which have been known to the public for the past twenty-five years, but have not come into general use on account of defects which it is my aim to remedy.

My improvements will first be described in connection with the drawings, and then specifically set out in the claims.

Figure 1:
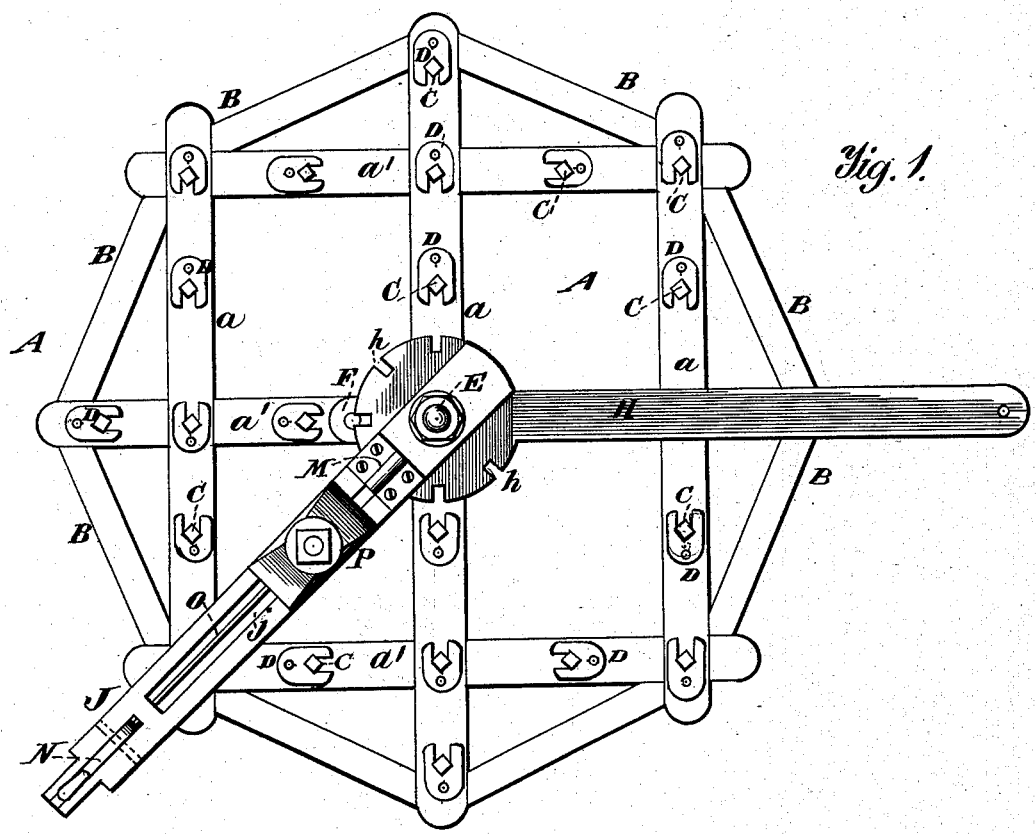
Figure 2:
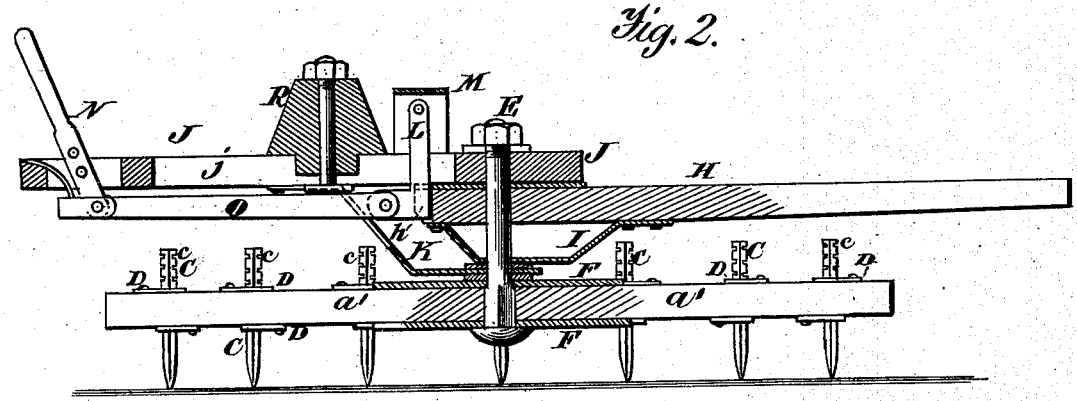
Figure 3:
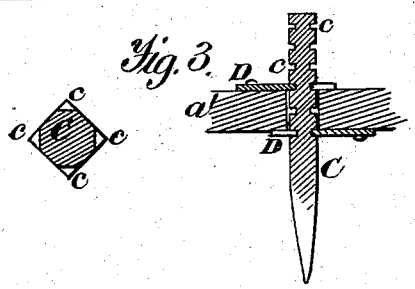

Figure 1 of the drawings is a plan view; Fig. 2, a sectional elevation through the center of harrow, with the hand-bar and draft-bar in alignment. Fig. 3 is a detail view of a tooth and its locking-plate.

In the drawings, A represents the harrow-frame, which is made in the well-known quadrangular form, and consists of the bars $a\ a\ a$, crossing other bars, $a'\ a'\ a'$, at right angles, the ends being extended beyond the point of junction. As these ends are farthest from the center of motion, they are liable to gather stones and other obstructions, as well as to be exposed to severe strains. In order to protect them against these contingencies, I insert between every two protruding ends a piece, B, which nearly forms a chord of the circle in which the harrow revolves, and, all taken together, nearly make the frame an octagon in shape. It will thus be perceived that the ends of each tooth are braced and counter-braced, while a collection of stones or trash is entirely prevented.

C represents a tooth provided with parallel horizontal grooves $c$, adapted to receive the opposite arms of the V-shaped locking-plate D, so as to prevent the tooth from working up or down in the tooth-bar.

E is the pivot-bolt, which turns with the harrow, and on which the draft-beam and hand-bar may turn separately or together. The shank is preferably squared on its neck, and fits a corresponding hole at the junction of the tooth-bars $a\ a'$, as well as in the break-joint plates F, which are placed on opposite sides of joint and at right angles to each other. By this means the parts about the center of harrow are thoroughly re-enforced, and all tendency of the tooth-bars to separate effectually counteracted.

H represents the draft-beam, which is made with a circular head notched at $h$ in the periphery of said head or disk and supported on both sides of the pivot-bolt E by a fast plate, I, so as to bring the draft-strain as low down on the bolt as possible, and to hold the draft-beam always out of reach of the upper ends of the teeth.

J represents the hand-bar, which is also pivoted on bolt E, so as to turn independently when not locked to the draft-beam. It is also supported by a bifurcated plate, K, made fast thereto.

L is an angular catch or detent, passing with one arm up through said hand-bar and end-pivoted in a V-shaped plate, M, made fast to the top of said hand-bar, so as to swing in and out of the notches $h$ in the beam-disk H. In order to make the catch easy to be operated by the party who may be harrowing, I connect the free arm of the catch with a hand-lever, N, by means of the pivoted rod O. As this lever stands vertically in the end of the hand-bar, the latter may be readily unlocked from the draft-beam and moved to either side thereof, according to the direction in which it is desired that the harrow shall turn; or it may be aligned with the draft-bar, as shown in Fig. 2 of the drawings, when the harrow need not revolve at all.

The hand-lever N is held forward by a rear spring, so as to securely lock the hand-bar and draft-beam until said lever is pressed forward at the top.

The hand-bar J has a longitudinal slot, $j$, in which slides the headed screw-bolt, whose shank passes up through a weight, R, and is held thereto by a clamp-nut. Thus it will be seen that by simply loosening or slightly unscrewing the nut which clamps the weight to the hand-bar the weight may be slid to a greater or less distance from the center of motion, so as to raise more or less of the teeth to a greater or less extent, and thus decrease the resistance to rotation, and by this means cause the harrow to rotate at varying velocities.

Having thus described all that is necessary to a full understanding of my invention, what I claim as new, and desire to protect by Letters Patent, is—

1. In a harrow, the combination, with a tooth-bar and rectangularly-notched tooth C, of two V-shaped plates, D D, arranged diagonally opposite to each other on the top and bottom of said tooth-bar, as shown in Fig. 3 of the drawings, and for the purpose specified.

2. The combination, in a rotary harrow, with hand-bar and draft-beam having a notched disk at its inner end, of a pivoted angular catch, L, a pivoted rod, O, and a hand-lever, N, all arranged to operate substantially as described.

SYLVESTER P. SAYRE.

Witnesses:
   JOHN N. MARTIN,
   IVEN OBER.